(12) United States Patent  
Barkan

(10) Patent No.: US 8,472,470 B1
(45) Date of Patent: *Jun. 25, 2013

(54) METHOD AND APPARATUS FOR AUTOMATICALLY DISABLING AN INTERFACE TO MEDIA IN A NETWORK DEVICE

(75) Inventor: Ozdal Barkan, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 298 days.

This patent is subject to a terminal disclaimer.

(21) Appl. No.: 12/906,934

(22) Filed: Oct. 18, 2010

Related U.S. Application Data

(63) Continuation of application No. 11/200,659, filed on Aug. 10, 2005, now Pat. No. 7,817,661.

(60) Provisional application No. 60/656,661, filed on Feb. 24, 2005.

(51) Int. Cl.
*H04L 12/66* (2006.01)

(52) U.S. Cl.
USPC .......................................... 370/463

(58) Field of Classification Search
USPC .......................................... 370/463
See application file for complete search history.

(56) References Cited

U.S. PATENT DOCUMENTS

| | | |
|---|---|---|
| 5,577,069 A | 11/1996 | Lau et al. |
| 7,054,309 B1 | 5/2006 | Hoot et al. |
| 7,120,721 B1 | 10/2006 | Tuttle et al. |
| 7,243,182 B2 | 7/2007 | Jensen et al. |
| 7,619,975 B1 | 11/2009 | Lo |
| 2003/0179709 A1 | 9/2003 | Huff |
| 2003/0179711 A1 | 9/2003 | Huff |
| 2004/0081196 A1 | 4/2004 | Elliott |
| 2004/0085974 A1 | 5/2004 | Mies et al. |
| 2004/0153854 A1 | 8/2004 | Agrawal et al. |
| 2004/0161207 A1 | 8/2004 | Chiu et al. |
| 2004/0161240 A1 | 8/2004 | Weber |
| 2005/0114663 A1 | 5/2005 | Cornell et al. |

*Primary Examiner* — Yemane Mesfin
*Assistant Examiner* — Wanda Z Russell

(57) ABSTRACT

An apparatus including a first interface module, a second interface module, and a first physical layer device. The first interface module is configured to interface the apparatus to a copper medium. The second interface module is configured to interface the apparatus to a fiber-optic medium. The first physical layer device is configured to generate a control signal in response to establishing a link over the copper medium via the first interface module. The control signal (i) activates a link indicator to indicate status of the link over the copper medium and (ii) deactivates the second interface module.

11 Claims, 3 Drawing Sheets

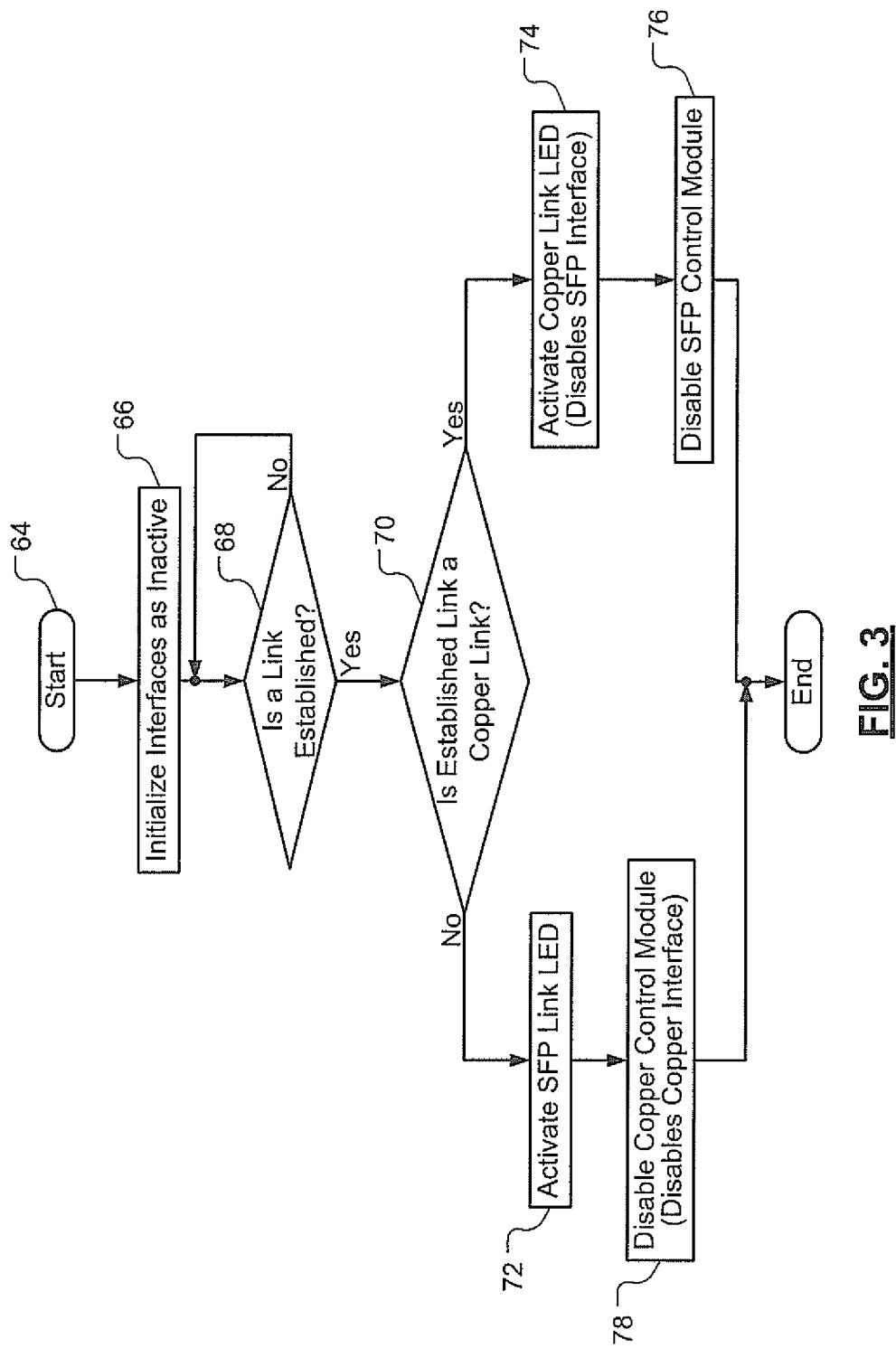

METHOD AND APPARATUS FOR AUTOMATICALLY DISABLING AN INTERFACE TO MEDIA IN A NETWORK DEVICE

CROSS-REFERENCE TO RELATED APPLICATIONS

This application is a continuation of U.S. application Ser. No. 11/200,659 (now U.S. Pat. No. 7,817,661), filed on Aug. 10, 2005, which claims the benefit of U.S. Provisional Application No. 60/656,661, filed on Feb. 24, 2005. The disclosures of the applications referenced above are incorporated herein by reference

TECHNICAL FIELD

The present invention relates to dual-media network interfaces, and more particularly to dual-media network interfaces that include small form-factor pluggable (SFP) interface modules.

BACKGROUND

Dual-media network interfaces support two separate interfaces for a single port of a network device. For example, a single port of an Ethernet network interface may include a first interface for a copper medium and a second interface for a fiber optic medium. However, both interfaces may also support the same types of media. Dual-media network interfaces allow flexibility by providing a user with an option between two potentially different media. Additionally, dual-media network interfaces allow users to utilize redundant network connections. For example, if a first interface of a dual-media network interface fails, the dual-media network interface may be programmed to automatically switch to a second interface that includes a redundant network connection. Such redundant network connections reduce network downtime.

Some dual-media network interfaces include small form-factor pluggable (SFP) interfaces that support SFP modules. SFP modules are interchangeable plug-in transceivers that are typically hot-swappable and provide interfaces for desired media. For example, SFP modules commonly provide interfaces for high-speed fiber optic media. However, SFP modules provide interfaces for other media such as copper media. SFP modules allow a user to quickly and inexpensively repair or upgrade a network device. For example, if an SFP module fails, the SFP module can be replaced without soldering components. Simultaneous active links for a single port of a dual-media network interface can cause significant network disruption and/or downtime including a total network failure. Therefore, only one interface of a dual-media network interface is active at a time.

Referring now to FIG. 1, a dual-media network interface 10 includes a medium access control (MAC) device 12 that communicates with a physical layer device 14 (or PHY). The physical layer device 14 communicates with first and second interfaces 16 and 18. The first interface 16 (labeled "A" in FIG. 1) is an SFP interface between the physical layer device 14 and an SFP module 20. The second interface 18 (labeled "B" in FIG. 1) is illustrated as a medium dependent interface (MDI) such as a copper media interface, although the second interface 18 may be another type of interface. For example, the second interface 18 may be hardwired and controlled by the physical layer device 14. Conversely, the SFP module 20 includes an independent physical layer device 22 that controls network communications between the SFP module 20 and external devices.

As discussed above, it is undesirable for the first and second interfaces 16 and 18, respectively, to simultaneously establish links between the physical layer device 14 and external devices. In one approach, the physical layer device 14 utilizes link monitoring software to determine when either the first or second interface 16 or 18, respectively, establishes a link. For example, a processor 23 may execute the link monitoring software and communicate with the physical layer device 14 via management data input/output and management data clock (MDC/MDIO) signals.

The processor 23 is capable of reading registers in the physical layer device 14 via the MDC/MDIO signals in order to monitor links between the physical layer device 14 and external devices. For example, the link monitoring software may periodically poll the first and second interfaces 16 and 18 to detect when one of the first or second interfaces 16 or 18, respectively, establishes a link. When a link is detected at one of the first or second interfaces 16 or 18, respectively, the link monitoring software ceases communications via the other of the first or second interfaces 18 or 16, respectively. For example, the link monitoring software may cease communications via an interface 16 or 18 by disabling an internal module that is dedicated to the particular interface 16 or 18.

Since the second interface 18 is controlled by the physical layer device 14, the link monitoring software is capable of quickly and completely ceasing communications via the second interface 18 when a link is detected at the first interface 16. However, it is possible for the independent physical layer device 22 to retain a link with an external device even after the link monitoring software ceases communications via the first interface 16. For example, in order to disable the SFP module 20, the processor 23 may first transmit a signal to the MAC device 12, which is then forwarded to a disable pin 24 of the SFP module 20 (identified as TX_DIS in FIG. 1). In this case, an appreciable delay occurs from the time when the processor 23 first detects a link at the second interface 18 to the time when the MAC device 12 disables the SFP module 20 via the disable pin 24.

Additionally, the delay may be further extended when the processor 23 is busy processing other data unrelated to the dual-media network interface 10. For example, a network device 25 that includes the dual-media network interface 10 may include a large number of ports. In this case, the external device may still detect a link with the dual-media network interface 10 and attempt to send packets, which may create a disruptive renegotiation loop or other network congestion when the external device does not detect a response. Also, during the period of time both the first and second interfaces 16 and 18, respectively, are capable of establishing links on the same port, which can cause significant network disruption.

SUMMARY

A dual-media network interface according to the present invention includes a physical layer device. A first interface module communicates with the physical layer device via a medium dependent interface. A small form-factor pluggable (SFP) interface module communicates with the physical layer device. A link indicator indicates a communications link with the physical layer device via the first interface module. The physical layer device transmits a link indication signal to the link indicator and the SFP interface module when the physical layer device establishes a communications link via the first interface module. The link indication signal activates the link indicator and disables the SFP interface module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a flowchart illustrating steps performed by the physical layer device of FIG. 2 when a link is detected at a media interface.

DETAILED DESCRIPTION

Figure 1:
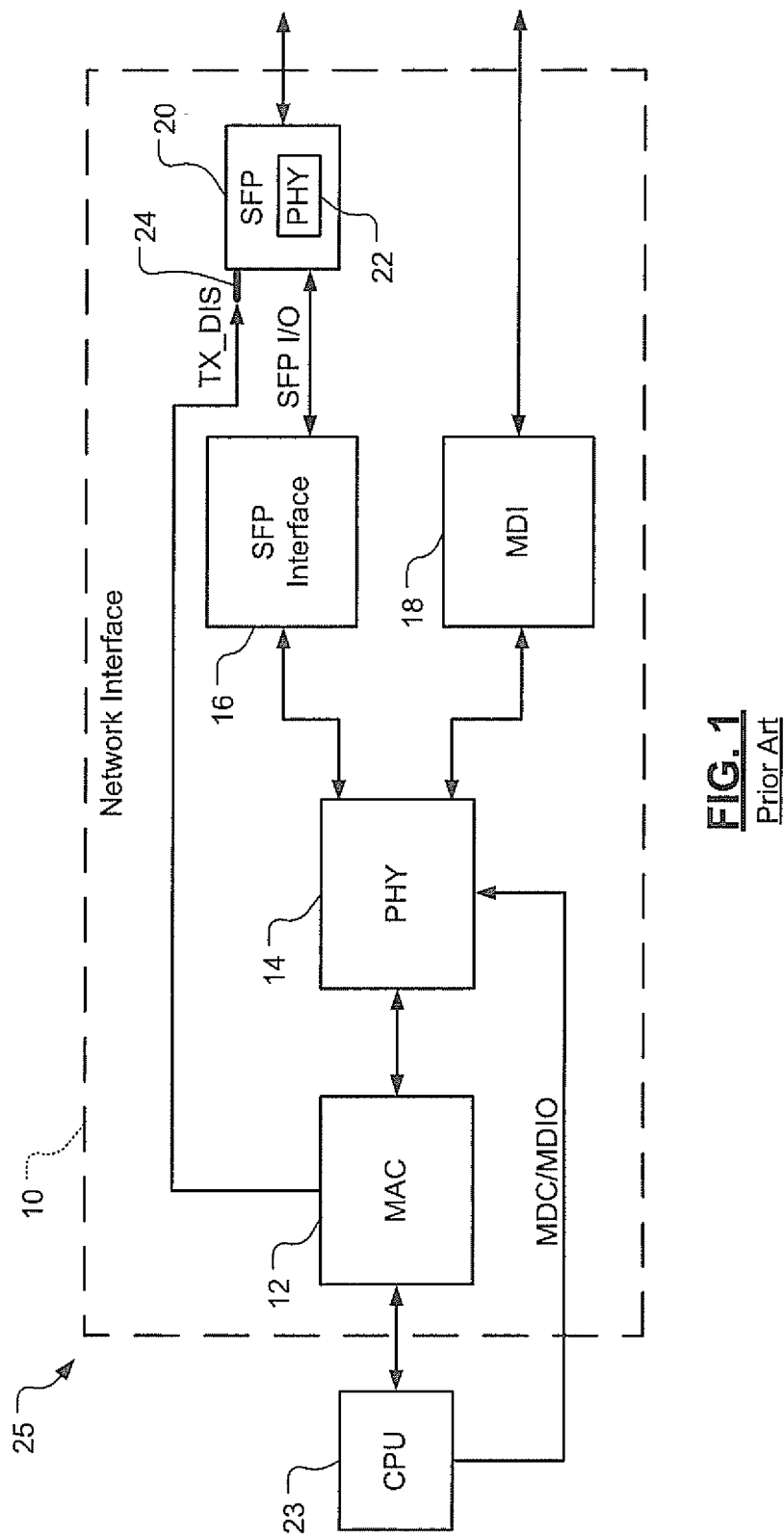
FIG. 1 is a functional block diagram of a dual-media network interface for a network device according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

A dual-media network interface according to the present invention automatically disables interfaces associated with inactive media when a link is established at another interface. The dual-media network interface prevents independent physical layer devices associated with small form-factor pluggable (SFP) modules from establishing or maintaining links with external devices after another interface previously establishes a link.

Figure 2:
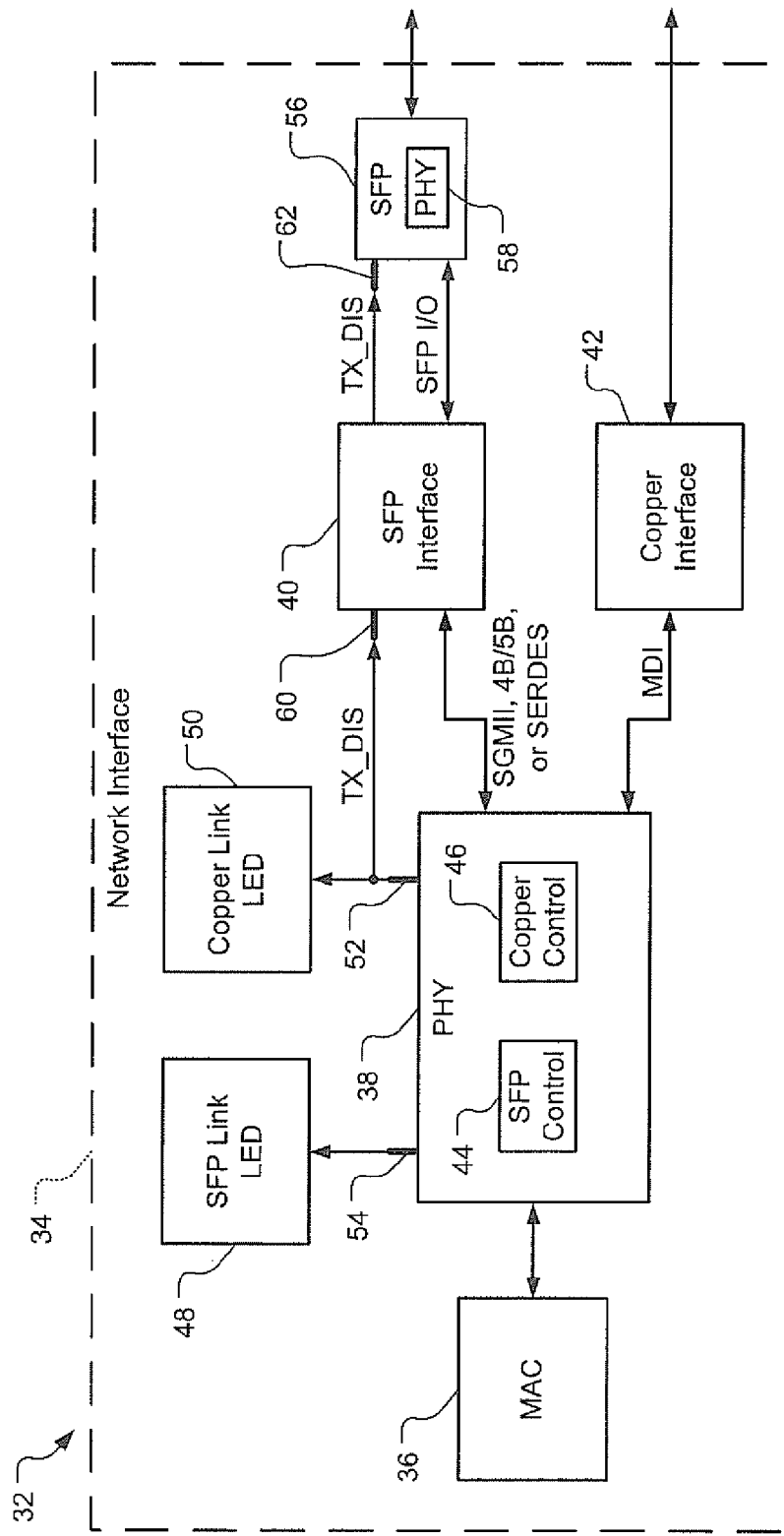
FIG. 2 is a functional block diagram of a dual-media network interface including a physical layer device that automatically disables inactive media according to the present invention.

Referring now to FIG. 2, an exemplary network device 32 includes a dual-media network interface 34 having a medium access control (MAC) device 36 that communicates with a physical layer device 38 (or PHY). The dual-media network interface 34 includes an SFP interface 40 and a copper interface 42. The SFP interface 40 communicates with the physical layer device 38 through a serial gigabit medium independent interface (SGMII) or another interface such as a 4-byte/5-byte (4B/5B) local fiber interface or a serializer/deserializer (SERDES) interface. In an exemplary embodiment, the SFP interface 40 supports SFP modules that interface with fiber media according to 100BASE-FX standards. Alternatively or additionally, the SFP interface 40 supports SFP modules that interface with copper media according to 10BASE-T, 100BASE-T, and/or 1000BASE-T standards and/or other current or future Ethernet standards.

The copper interface 42 communicates with the physical layer device 38 through a medium dependent interface. For example, the copper interface 42 may be hard-wired and solely controlled by the physical layer device 38. Additionally, the copper interface 42 may include an RJ-45 connector with or without integrated magnetics (MAG). In an exemplary embodiment, the copper interface 42 interfaces with copper media according to 10BASE-T, 100BASE-TX, and/or 1000BASE-T standards.

The physical layer device 38 includes an SFP control module 44 that is associated with the SFP interface 40 and a copper control module 46 that is associated with the copper interface 42. The physical layer device 38 ceases communications via the SFP interface 40 and/or the copper interface 42 by disabling the SFP control module 44 and/or the copper control module 46, respectively. For example, the physical layer device 38 may utilize link monitoring software that detects established links at the SFP and copper interfaces 40 and 42, respectively. The dual-media network interface 34 includes an SFP link indicator 48 and a copper link indicator 50. For example, the SFP and copper link indicators 48 and 50, respectively, may be light-emitting diodes (LEDs) or other types of indicators 48 and 50 that indicate the presence of an established link to a user. The physical layer device 38 activates the copper link indicator 50 when a link is established at the copper interface 42. Likewise, the physical layer device 38 activates the SEP link indicator 48 when a link is established at the SFP interface 40.

According to an exemplary embodiment, the physical layer device 38 includes a copper link indication pin 52 and an SFP link indication pin 54. The physical layer device 38 asserts the copper link indication pin 52 and disables the SFP control module 44 when a link is established at the copper interface 42. Likewise, the physical layer device 38 asserts the SFP link indication pin 54 and disables the copper control module 46 when a link is established at the SFP interface 40. For example, disabling the copper control module 46 disables the copper interface 42. The physical layer device 38 may assert the copper link indication pin 52 and SFP link indication pin 54 by outputting a logical high signal, a logical low signal, or another signal at a specific voltage or within a specific voltage range.

The SFP interface 40 supports an SFP module 56 including an independent physical layer device 58. Therefore, disabling the SFP control module 44 alone does not necessarily prevent the SFP module 56 from establishing a link with an external device. Communications standards typically require that SFP interfaces 40 include a disable pin 60. The SFP interface 40 and the SFP module 56 are disabled when the disable pin 60 is asserted. For example, the SFP module 56 may include a disable pin 62 that communicates with the disable pin 60 of the SFP interface 40. According to the present invention, the disable pin 60 of the SFP interface 40 communicates with the copper link indication pin 52. Therefore, when the physical layer device 38 asserts the copper link indication pin 52, the SFP interface 40 and the SFP module 56 are automatically and immediately disabled.

Since the copper interface 42 is solely controlled by the copper control module 46, the copper interface 42 is automatically disabled when the physical layer device 38 disables the copper control module 46. Additionally, the SFP interface 40 and SFP module 56 are automatically disabled when a link is established at the copper interface 42. Therefore, the present invention avoids problems associated with double linking that can occur when a processor performs link monitoring. For example, in prior art systems, software delays in processors prevent the physical layer device 38 from immediately disabling the SFP module 56 when a link is established at the copper interface 42.

According to the present invention, double linking is avoided in this case because the physical layer device 38 does not wait for the link monitoring software to first detect the link at the copper interface 42 and then take action. Instead, the SFP interface 40 and SFP module 56 are disabled as soon as the physical layer device 38 detects the link at the copper interface 42 and activates the copper link indicator 50. Therefore, the SFP interface 40 and the SFP module 56 will already be disabled by the time the link monitoring software detects the link at the copper interface 42. Therefore, there is no longer an overlap in time where the SFP and copper interfaces 40 and 42, respectively, are capable of simultaneously establishing links. Additionally, the independent physical layer device 58 in the SFP module 56 is unable to retain a link with an external device after a link is established at the copper interface 42.

SFP modules 56 that interface with fiber media will typically shut down automatically and refrain from establishing links with external devices when the physical layer device 38 disables the SFP control module 44. However, the SFP module 56 may still establish a link with an external device when unintentional signal conditions such as noise occur. Therefore, unintentional links with external devices are avoided by completely disabling both the SFP interface 40 and the SFP module 56 when a link occurs at the copper interface 42.

Referring now to FIG. 3, a link detection algorithm begins in step 64. In step 66, the physical layer device 38 initializes the SFP interface 40 and the copper interface 42 as inactive. In step 68, control determines whether a link has been established at either the SFP interface 40 or the copper interface 42. If false, control loops to step 68. If true, control proceeds to step 70. In step 70, control determines whether the link was established at the copper interface 42. If false, control proceeds to step 72. If true, the physical layer device 38 activates the copper link indicator 50 in step 74.

Since the disable pin 60 is tied to the copper link indication pin 52, the physical layer device 38 also disables the SFP interface 40 by activating the copper link indicator 50. In step 76, the physical layer device 38 disables the SFP control module 44 and control ends. In step 72, the physical layer device 38 activates the SFP link indicator 48. In step 78, the physical layer device 38 disables the copper control module 46 and control ends. Since the copper interface 42 is completely controlled by the physical layer device 38, the copper interface 42 is also disabled in step 78.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An apparatus comprising:
a first interface module configured to interface the apparatus to a copper medium;
a second interface module configured to interface the apparatus to a fiber-optic medium; and
a first physical layer device configured to generate a control signal in response to establishing a link over the copper medium via the first interface module,
wherein the control signal (i) activates a link indicator to indicate status of the link over the copper medium and (ii) deactivates the second interface module.

2. The apparatus of claim 1, wherein the second interface module includes:
a small form-factor pluggable interface module configured to interface with the first physical layer device, and
a second physical layer device configured to interface the small form-factor pluggable interface module to the fiber-optic medium.

3. The apparatus of claim 2, further comprising:
the link indicator,
wherein the small form-factor pluggable interface module includes a first input,
wherein the second physical layer device includes a second input, and
wherein the control signal drives the link indicator, the first input, and the second input.

4. The apparatus of claim 2, wherein:
the first interface module is configured to interface with the first physical layer device via a medium dependent interface; and
the small form-factor pluggable interface module is configured to interface with the first physical layer device via (i) a serial gigabit medium independent interface, (ii) a 4-byte/5-byte local fiber interface, or (iii) a serializer/deserializer interface.

5. A dual-media network interface comprising:
the apparatus of claim 1,
wherein only one of the first interface module and the second interface module is active at a time.

6. A network device comprising the dual-media network interface of claim 5.

7. A method comprising:
interfacing an apparatus to a copper medium via a first interface module;
interfacing the apparatus to a fiber-optic medium via a second interface module;
generating a control signal in response to establishing a link over the copper medium via the first interface module;
activating a link indicator using the control signal to indicate status of the link over the copper medium; and
deactivating the second interface module using the control signal.

8. The method of claim 7, wherein the second interface module includes a small form-factor pluggable interface module having a first input and a first physical layer device having a second input, the method further comprising:
interfacing the apparatus to the fiber-optic medium via the first physical layer device; and
driving the link indicator, the first input, and the second input using the control signal.

9. The method of claim 8, further comprising:
interfacing the first interface module to a second physical layer device of the apparatus via a medium dependent interface; and
interfacing the small form-factor pluggable interface module to the second physical layer device via (i) a serial gigabit medium independent interface, (ii) a 4-byte/5-byte local fiber interface, or (iii) a serializer/deserializer interface.

10. The method of claim 7, wherein the apparatus includes a dual-media network interface, the method further comprising activating only one of the first interface module and the second interface module at a time.

11. The method of claim 10, further comprising implementing the method in a network device comprising the dual-media network interface.

* * * * *